United States Patent [19]
Di Stefano

[11] Patent Number: 5,950,490
[45] Date of Patent: Sep. 14, 1999

[54] MULTI-CLUTCHED TRANSMISSION SYSTEM

[76] Inventor: Alfonso Di Stefano, 15032 Mack Ave., Grosse Pointe Park, Mich. 48230

[21] Appl. No.: 09/041,162

[22] Filed: Mar. 12, 1998

[51] Int. Cl.[6] ...................................................... F16H 3/08
[52] U.S. Cl. ................................ 74/333; 74/334; 74/371; 74/372; 192/87.14; 192/87.18
[58] Field of Search .............................. 74/333, 371, 372, 74/373; 192/48.91, 70, 85 AB, 87.14, 87.18

[56] References Cited

U.S. PATENT DOCUMENTS 5,419,419  5/1995  Macpherson ............................... 74/333
5,507,195  4/1996  Trick ......................................... 74/333

*Primary Examiner*—Charles A Marmor
*Assistant Examiner*—Tisha D. Waddell
*Attorney, Agent, or Firm*—Christopher P. Maiorana P.C.

[57] ABSTRACT

A multi-clutched transmission system which may be implemented in an automobile or other motor vehicle. A common drive shaft is generally coupled to a number of clutches comprising a number of inner drive portions and a number of outer portions. A number of gears may be provided that are in contact with a selected one of the clutches. A pressurized hydraulic input chamber may move within the system to engage one of the clutches with a particular gear. When a particular one of the clutches is engaged, a specific torque is generated at the output drive shaft.

7 Claims, 4 Drawing Sheets

5,950,490

MULTI-CLUTCHED TRANSMISSION SYSTEM

FIELD OF THE INVENTION

The present invention relates to transmissions generally and, more particularly, to a multi-clutch transmission with a speed control.

BACKGROUND OF THE INVENTION

It is known in the art to provide a transmission for converting energy derived from an engine into torque that is useable to drive the wheels of an automobile, or other vehicle, in which the transmission is implemented. A clutch is generally coupled between the drive portions and the driven portions to engage and disengage the driven portion. Many such systems use a single clutch to drive a variable number of gears. Other systems may implement a fairly complex gearing system. A disadvantage with such a conventional transmission system is that when the clutch apparatus eventually wears out, it is fairly expensive to repair the transmission. Such repairs are often included in the initial warranty of a vehicle in which the transmission is implemented, which increases the overall cost the vehicle manufacturer must absorb as an ongoing cost of doing business.

It would be desirable to reduce the initial cost of manufacturing a transmission as well as to increase the useful life of a transmission such that the overall costs associated with the transmission are reduced.

SUMMARY OF THE INVENTION

The present invention provides a multi-clutched transmission system that may be implemented in an automobile or other motor vehicle. A common drive shaft is generally coupled to a number of gears. A number of clutches may comprise a number of inner drive portions and a number of outer portions. The outer portions of the clutches are each coupled to one of the plurality clutches. A pressurized hydraulic input chamber may move within the system to engage one of the clutches with a particular gear that is in motion. When a particular one of the clutches is engaged, a specific torque is generated at an output drive shaft coupled to each of the inner portions of the clutches.

Objects, features and advantages of the present invention include providing a multi-clutched transmission that requires a reduced number of parts, extends the useful life of the transmission and provides a simplified shifting mechanism.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
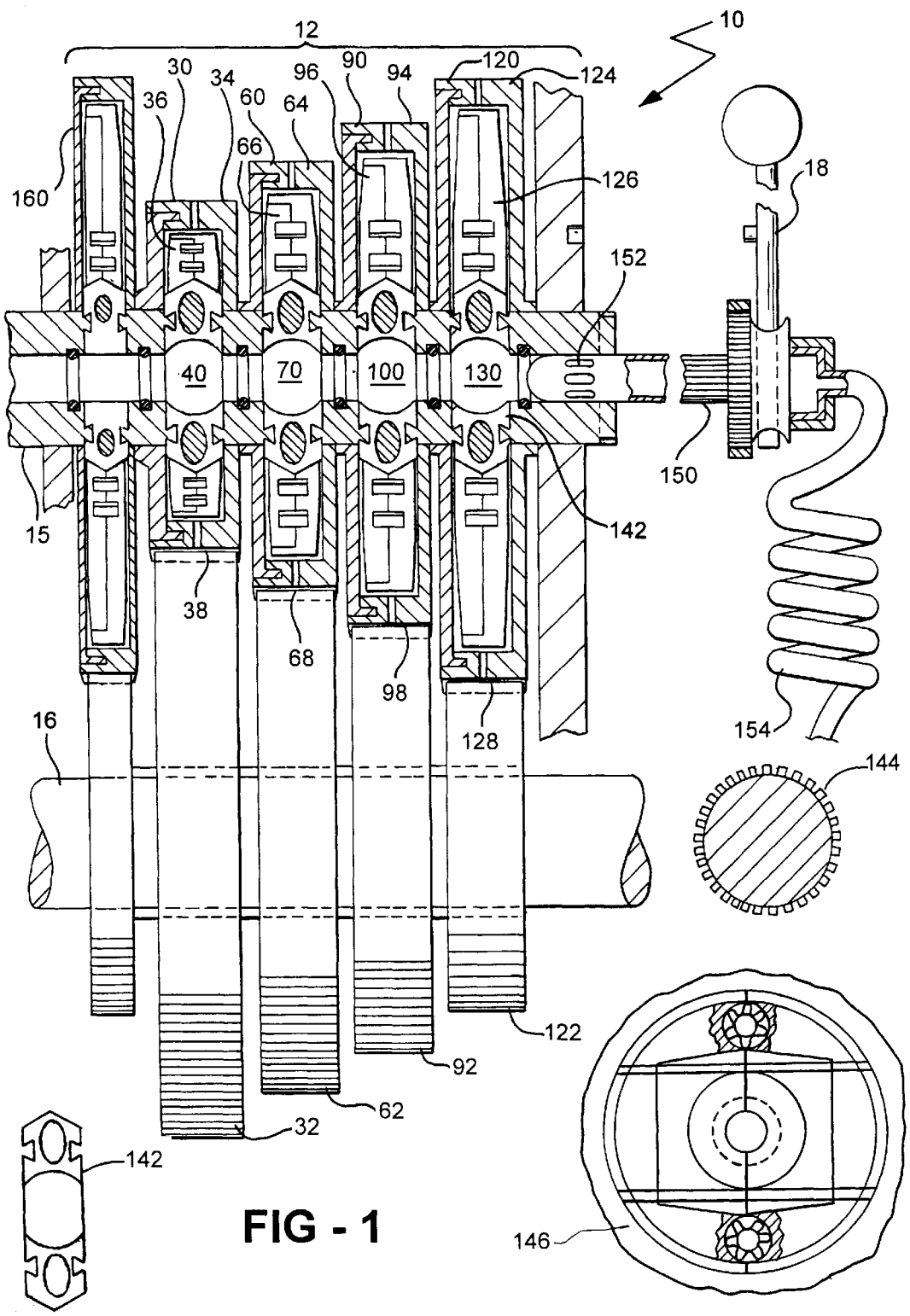
FIG. 1 is a diagram of the preferred embodiment of the present invention.

Referring to FIG. 1, a multi-clutched transmission 10 is shown in accordance with a preferred embodiment of the present invention. The transmission 10 generally comprises a clutch portion 12, a gear portion 14, a drive shaft 15, an input shaft 16 and a shifter 18. The clutch portion 12 generally comprises a clutch system 30, a clutch system 60, a clutch system 90 and a clutch system 120. The particular number of clutch systems 30–120 may be modified (e.g., increased or decreased) to meet the design criteria of a particular application. In the example of FIG. 1, four clutch systems 30–120 are shown which generally correspond to a four speed transmission. Additional clutches may be provided to include a single overdrive gear, or multiple overdrive gears. The clutch portion 12 generally comprises a gear 32, a gear 62, a gear 64 and a gear 66. The clutch portion 30 generally meshes, or comes in contact, with the gear portion 32. Similarly, the clutch portions 60, 90 and 120 generally mesh with the gear portions 62, 92 and 122.

The clutch portion 30 generally comprises an outer portion 34 and an inner portion 36. The outer portion 36 is generally coupled to the input shaft 16 through the gear 32 at an interface 38. As a result, the drive shaft 15 spins in a generally angular fashion in response to energy transferred to the inner portion 36 from the outer portion 34. When a particular clutch (e.g., 30) is engaged (to be described in more detail in connection with FIG. 2), the outer portion 34 presents a torque which is received from the gear portion 32 through an interface 38. It should be appreciated that the clutch portions 60, 90 and 120 each have a corresponding outer portion 64, 94 and 124 and corresponding inner portions 66, 96 and 126. While only one inner portion 36, 66, 96 and 126 is generally engaged at a time, each of the outer portions 34, 64, and 124 are generally connected together and will spin in an axial fashion about the drive shaft 15. As a result, the inter-meshing between the clutch portions 30, 60, 90 and 120 with the gear portions 32, 62, 92 and 122 does not require engaging and disengaging between particular gears as may be found in conventional transmissions. The result of this continuous intermeshing is that the transmission 10 has a much longer useful life before maintenance is required.

Figure 2:
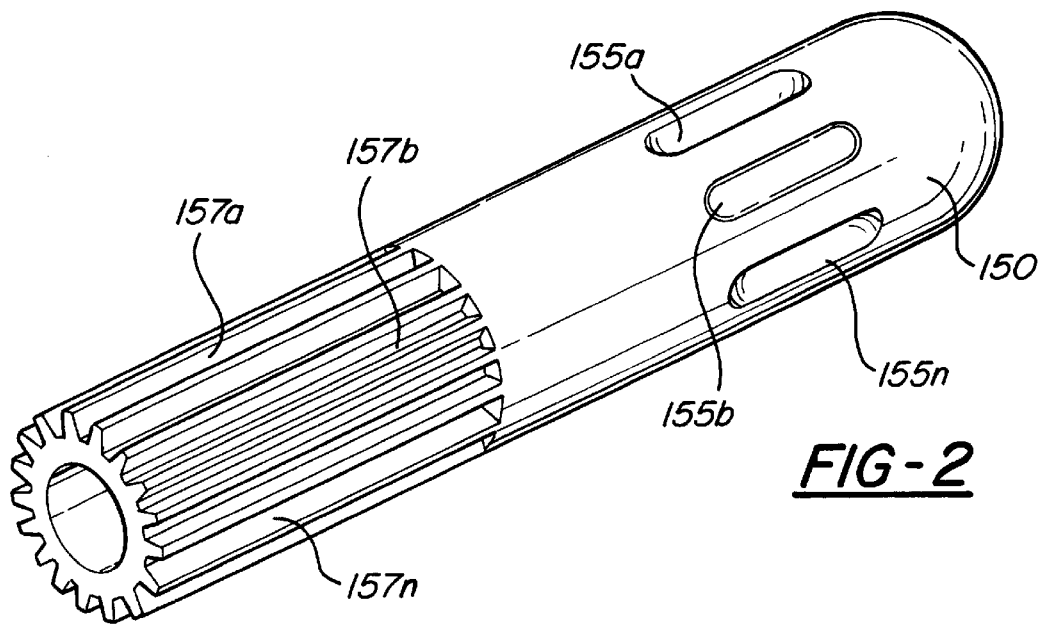
FIG. 2 is a diagram of a hydraulic input chamber.

The clutch portion 12 generally includes a hydraulic chamber 40. The hydraulic chamber 40 receives pressure from a hydraulic input chamber 150 that moves in a generally linear fashion within the clutch portion 12. Referring to FIG. 2, the hydraulic input chamber 150 may be implemented having a number of openings 155a–155n that present pressurized fluid to the chamber 40. A number of grooves 157a–157n may also be provided to release the pressure from one chamber when shifting to another chamber. When the shifter portion 18 moves the hydraulic input chamber 150 in line with the hydraulic chamber 40, the clutch 30 is generally engaged. The result is that the single hydraulic input chamber 150 can individually engage each of the clutch systems 30, 60, 90 and 120 in accordance with the shifting necessary for the transmission 10 to transmit torque to the drive shaft portion 15.

Referring back to FIG. 1, the hydraulic input chamber 150 is generally connected to the shifter 18 to provide a user input to control the shifting. As the shifter 18 is moved, the hydraulic input chamber 150 is engaged with one of the chambers 40, 70, 100 or 130 of one of the clutch systems 30, 60, 90 or 120. A portion 152 between the particular hydraulic chambers 40, 70, 100 and 130 may be, in one example, sufficiently wide to prevent the hydraulic input chamber 150 from engaging more than one of the hydraulic chambers 40, 70, 100 or 130 at a given time. By positioning the portion 152 having a distance larger than the hydraulic input chamber 150, the need to provide a clutch to disengage the hydraulic pressure is generally removed. When the hydraulic input chamber 150 is in line with the portion 152, the pressure from the hydraulic fluid generally pushes into a stationary portion of the transmission 10, which in effect eliminates the need to disengage the hydraulic pressure.

The hydraulic input chamber 150 may receive hydraulic fluid through a hydraulic line 154. The type of hydraulic fluid should generally be sufficiently non-compressible to allow proper operation of the hydraulic chambers 40, 70, 100 or 130. Additionally, the hydraulic fluid may be selected such that it provides a lubricating effect throughout the transmission 10. A bleed back device (not shown) may be provided to allow replacement of the hydraulic fluid at periodic intervals.

The hydraulic chambers 40, 70, 100 and 130 may be modified accordingly to meet the design criteria of a particular application to allow the engagement between the outer portion 34 and the inner portion 36. For example, the interface between the inner portion 36 and the outer portion 34 in FIG. 1 is generally shown having a slightly parabolic curve. The example in FIG. 4 however, shows a relatively straight portion 180 generally connected to another straight portion 182. In general, a maximum surface area between the inner portion 36 and the outer portion 34 is generally desirable to increase the overall efficiency of the transmission. A portion 142, a portion 144 and a portion 146 illustrate cross-sectional views of various portions (e.g., the portions 16, 30, 32, 60, 62, 90, 92, 120 and/or 122).

Figure 3:
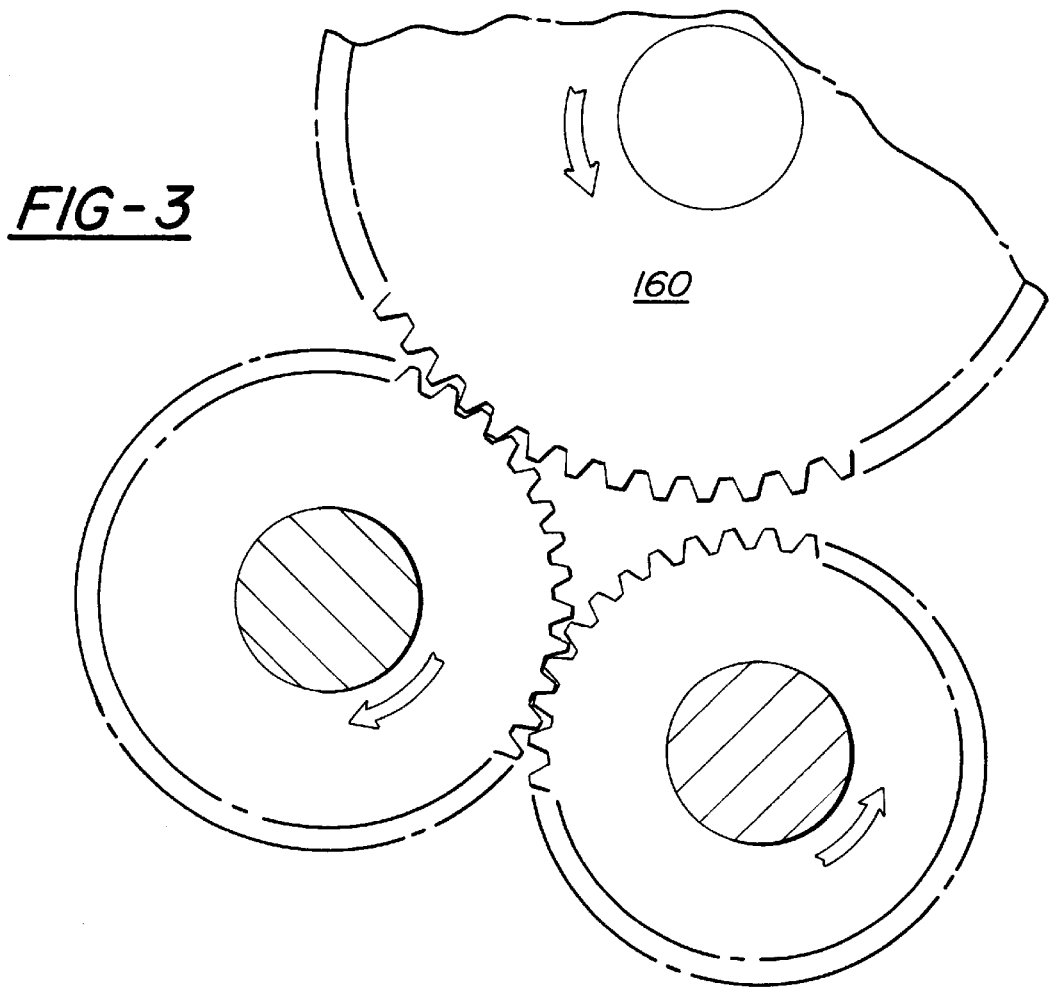
FIG. 3 is a cross sectional view of a reverse gear.

Referring to FIG. 3, in addition to the clutch systems 30a–30n, a clutch system 160 may be implemented to provide a reverse gear to drive the drive shaft portion 16.

Figure 4:
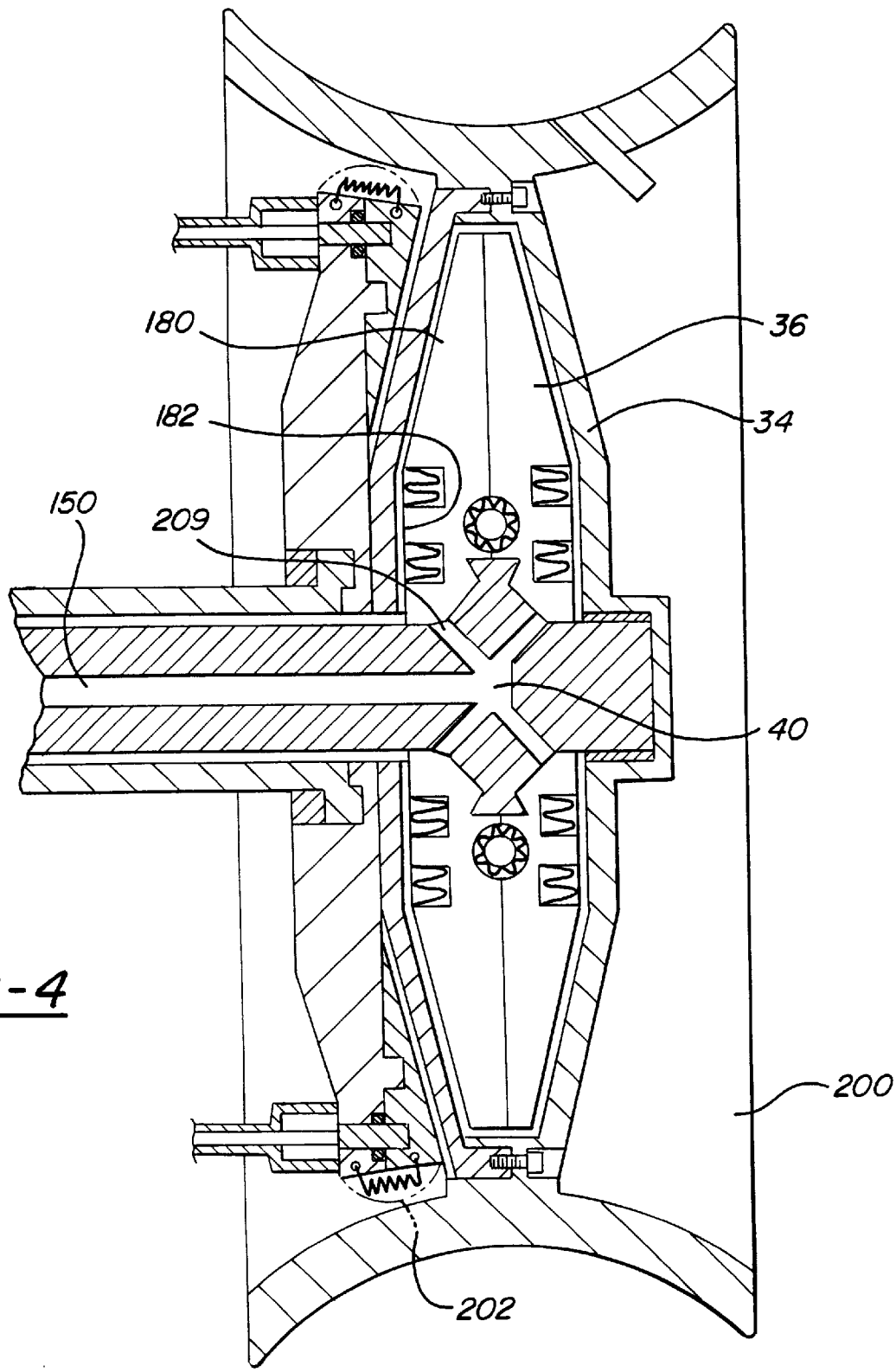
FIG. 4 is a diagram of the present invention implemented in a wheel.

Referring to FIG. 4, a diagram of one of the clutch systems (e.g., the clutch system 30) is shown implemented in a wheel 200. With such a system, a number of wheels 200 can each be used to drive a motor vehicle. The clutch system 30 shows the inner portion 36 engaged with the outer portion 34. The hydraulic chamber 40 is shown such that when hydraulic fluid is presented at the hydraulic input chamber 150, a piston 209 causes the inner portion 36 to engage with the outer portion 34.

In general, the present invention eliminates the need for a flywheel. In the example of FIG. 4, where the clutch system 30 is used in the wheel 200, a return spring 202 may be implemented to provide a disengagement between the inner portion 36 and the outer portion 34.

Figure 5A:
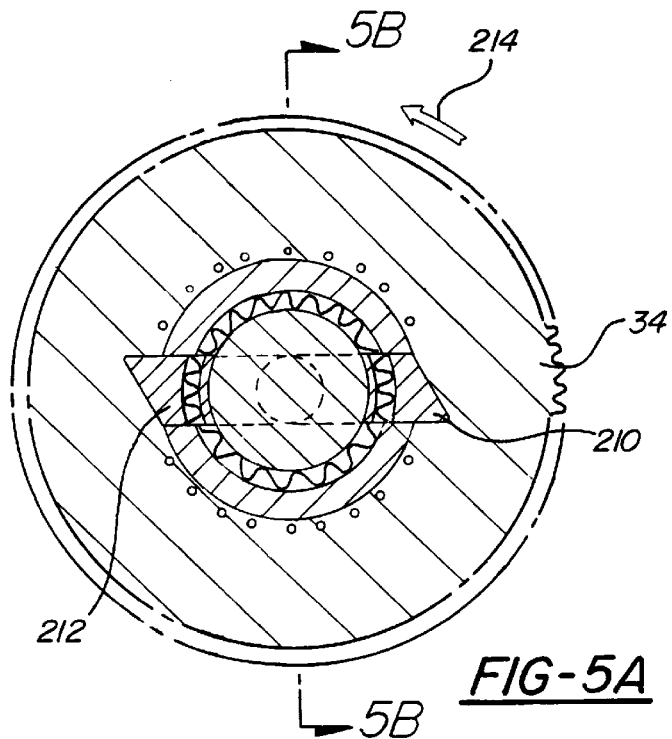
FIG. 5 is an alternate embodiment of the present invention.
Figure 5B:
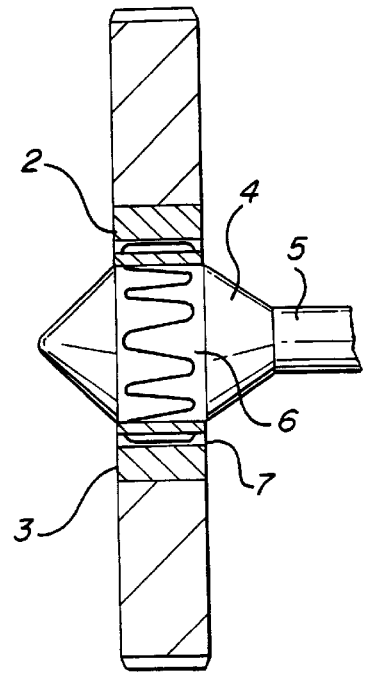

Referring to FIG. 5, an alternate embodiment of the present invention is shown that may eliminate the clutch portions 30. An angle portion 210 and 212 are shown implemented about a center axial portion. The angled portions 210 and 212 engage into the outer portion 34. When the outer portion 34 spins in a direction indicated by the arrow 214, a driving effect is provided to the drive shaft 15. However, when the outer portion 34 is spinning in the opposite direction of the arrow 214, the outer portion 34 generally spins with respect to the drive shaft 15.

Figure 6A:
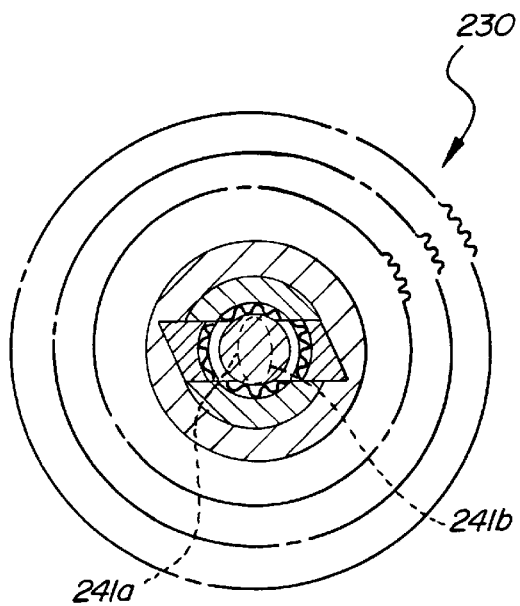
FIG. 6 is a second alternate embodiment of the present invention.
Figure 6B:
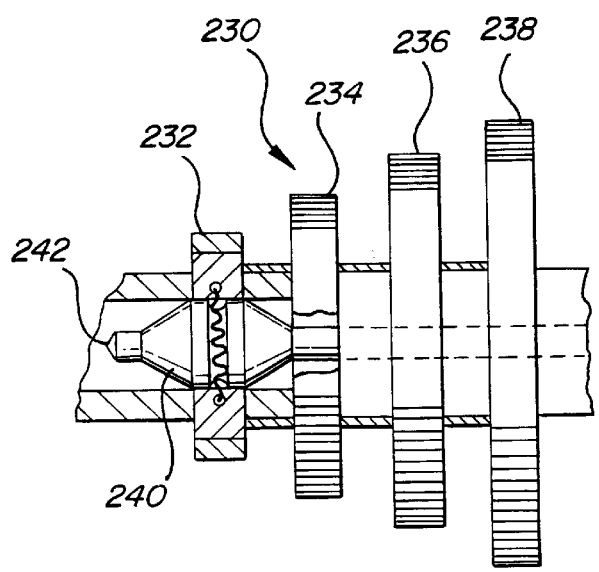

Referring to FIG. 6, a transmission implementing a number of the embodiments of FIG. 5 is shown. The transmission 230 generally comprises a gear 232, a gear 234, a gear 236 and a gear 238. Each of the gears 232–238 generally comprises the alternate embodiment shown in FIG. 5. Since each of the gears 232–238 only provides power to the drive shaft in one direction, an effective automatic gearing of the transmission 230 may occur. The angled portions 210 and 212 have inner portions 241a and 241b that, when completely retracted, provide a space allowing an end 242 to provide proper engagement.

It is to be understood that modifications to the invention might occur to one with skill in the field of the invention within the scope of the appended claims. For example, the shifter 18 may be replaced with an automatic shifting device as known in the art.

I claim:

1. A transmission comprising:

an input shaft for receiving energy from an external device;

a plurality of gears each in contact with said input shaft;

a plurality of clutches each having (i) a first portion connected to one of said plurality of gears and (ii) a second portion, wherein each of said first and second portions are independently engageable;

a drive shaft connected to each of said second portions of said clutches, wherein one of said second portions of said clutches transfers energy to said drive shaft; and a plurality of engaging devices each connected to one of said clutches, wherein one of said engaging devices engages one of said first portions with one of said second portions in response to a hydraulic input chamber configured to move within each of said engaging devices.

2. The transmission according to claim 1, wherein said engaging devices each comprise a hydraulic chamber.

3. The transmission according to claim 1, further comprising a shifting device configured to move said hydraulic input chamber between said plurality of engaging devices to determine which of said clutches is engaged, wherein said shifting device is connected to said hydraulic input chamber.

4. The transmission according to claim 1, wherein each of said plurality of gears mesh with said first portion of one of said plurality of clutches.

5. The transmission according to claim 1, wherein said hydraulic input chamber has a predetermined width.

6. The transmission according to claim 1, wherein said plurality of engaging devices are each separated by a portion having a distance greater than said predetermined width of said hydraulic input chamber.

7. A transmission comprising:

means for receiving energy from an external device;

a plurality of gears each in contact with said input shaft;

a plurality of clutches each having (i) a first portion connected to one of said plurality of gears and (ii) a second portion, wherein each of said first and second portions are independently engageable;

drive means connected to each of said second portions of said clutches, wherein one of said second portions of said clutches transfers energy to said drive shaft; and a plurality of engaging devices each connected to one of said clutches, wherein one of said engaging devices engages one of said first portions with one of said second portions in response to hydraulic input means configured to move within each of said engaging devices.

* * * * *